March 25, 1924. 1,488,292
W. SCHONFIELD
ADJUSTABLE STAY FOR DOORS, WINDOWS, FANLIGHTS, AND THE LIKE
Filed Jan. 22, 1923
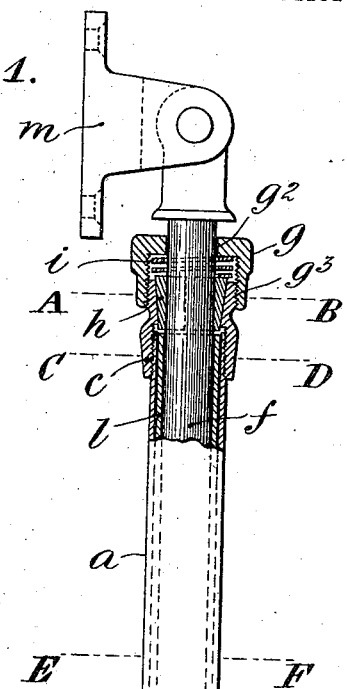
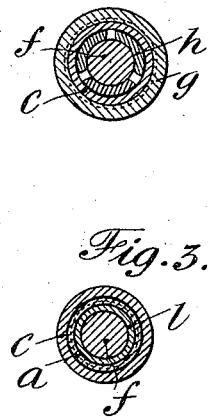
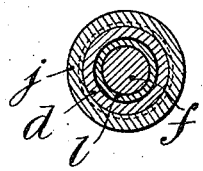
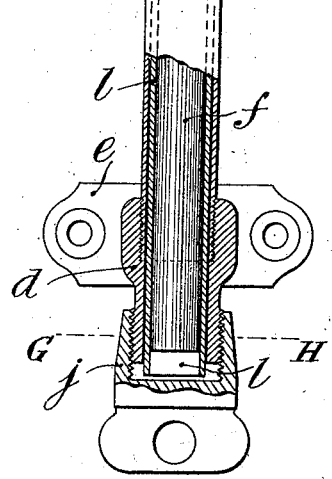
Inventor
William Schonfield
By
Attorney Patented Mar. 25, 1924.

1,488,292

UNITED STATES PATENT OFFICE.

WILLIAM SCHONFIELD, OF LONDON, ENGLAND.

ADJUSTABLE STAY FOR DOORS, WINDOWS, FANLIGHTS, AND THE LIKE.

Application filed January 22, 1923. Serial No. 614,233.

*To all whom it may concern:*

Be it known that I, WILLIAM SCHONFIELD, a subject of the King of Great Britain, residing at 22 Great St. Andrew Street, Shaftesbury Avenue, London, W. C. 2, in the county of London, England, have invented certain new and useful Improvements in Adjustable Stays for Doors, Windows, Fanlights, and the like, of which the following is a specification.

The invention relates to an adjustable stay for a door, window, fan-light or the like of the kind in which a tube length connected at one end to an attachment bracket forms the body part of the stay, and a central rod slides within this tube length from its other end and is attached to another attachment bracket, and is connected to the tube length by a friction grip.

The invention provides an adjustable stay of this kind in which at the one end of the tubular body an automatically acting friction grip is provided, and at the other end of said body a hand operated release to said grip using an internal tubular connector, or equivalent, between the grip and the hand operated member. The grip normally holds the rod to the tubular body, and the amount of friction it creates may be adjusted, and the release is to temporarily free the grip so that the effective length of the stay may be regulated.

The grip is in the form of a split bush applied to the one end of the tubular body to be automatically pressed into action by a coiled or other spring operative between the one end of the bush and a sleeve-like nut applied to the adjacent end of the tubular body, while the release is conveniently the tubular connector, aforesaid, encircling the rod freely and freely fitting the tubular member and operative between the inner end of the bush and a cap nut applied to that end of the tubular body remote from where the bush is disposed.

With the invention an adjustable stay having an automatically acting friction grip can have its friction grip very quickly and conveniently released by the simple part rotation of the cap nut, so that the effective length of the stay may be regulated, after which the release can again be put out of action so that the grip operates.

The invention is represented by the accompanying drawings.

Fig. 1 is a longitudinal section elevation of the complete stay.

Fig. 2 is a transverse section of Fig. 1 on the dotted lines A. B.

Fig. 3 is a transverse section of Fig. 1 on the dotted lines C. D.

Fig. 4 is a transverse section of Fig. 1 on the dotted lines E. F. and

Fig. 5 is a transverse section of Fig. 1 on the dotted lines G. H.

The body part of the stay is formed by the tube length $a$ and its permanently attached ends $c$ and $d$ to the latter of which the attachment bracket $e$ is conveniently applied.

A central rod $f$ slides within this tube length $a$ from the end $c$ which is fitted with a sleeve-like nut $g$ provided with an axial hole $g^2$ through which the rod slides, this nut $g$ screwing onto the end $c$ at $g^3$. Within the end $c$ of the tube length $a$ is fitted a split bush $h$ to grip the end $c$ internally and to grip the rod $f$ externally, the latter passing through the bore of said bush which is externally tapered and is formed of three segments, the end $c$ being tapered to correspond to the tapering of the bush. The outer end of the bush normally extends beyond the extremity of the end $c$ of the tube body $a$ to lie within the nut $g$ and between this outer end of the bush and the inner end of the nut $g$ a short length coiled spring $i$ operates in compression to normally force the bush $h$ wedge-like into the end $c$ and against the rod $f$ using the nut $g$ as a thrust abutment.

In this manner a friction grip is provided at the end of the length $a$ normally gripping the rod and the tube end so as to oppose frictional resistance to the telescopic sliding action of the rod within the tube $a$, the amount of which resistance may conveniently be adjusted by more or less screwing up the nut $g$ said resistance however being a resilient one tending to free an outward movement of the rod but lock any inward movement of said rod.

Upon the other end $d$ of the tube length $a$ a cap nut $j$ screws. Disposed within the tube $a$ between this cap nut and the inner end of the bush $h$ is a connector in the form of a loose tubular piece $l$ coupling the cap nut to the bush in such manner that if the cap nut $j$ is screwed up the loose tubular piece is forced against the bush to move said bush against the action of the coiled spring $i$ so that the friction grip of the bush $h$ on the rod is relieved. A small amount of rotation of this cap nut only is necessary to relieve the friction grip and a similar amount in slacking back the capnut without detachment to allow the friction grip to again come into action.

The tubular piece $l$ fits within the body tube $a$ loosely and loosely surrounds the rod $f$ and is a separately formed part slipped into the body tube $a$ from the cap nut end before the latter is screwed on said end.

In this way an adjustable friction grip is fitted to one end of the tube body $a$ and a hand release to be operated from the other end of said tube body. The nuts $g$ and $j$ may be milled for hand rotation or may be wing nuts or may be arranged for operation from the end of a long pole, it being understood that the friction grip can be varied by tightening up the one nut and can be entirely relieved by a small amount of rotation of the other nut.

The cap nut $j$ may be fitted so as not to become totally detached from its end of the tube body, this feature being also applicable to the nut $g$. The other attachment bracket $m$ is applied to the outer end of the rod $f$ and it will be clear that the brackets may be of various kinds suitable for the particular application say to doors, windows, fan-lights or the like.

Having now described my invention what I claim and desire to secure by Letters Patent is:—

1. An adjustable stay of the kind described, comprising a tubular body adapted for attachment by a bracket, a rod axially slidable longitudinally of said tubular body and also adapted for attachment by a bracket, said rod being of substantially the same length as said body, an automatically acting friction grip between the body and the rod at the one end of said body, a hand operated member applied to the other end of said body, and a connector disposed within the body between the hand operated member and the friction grip, substantially as described.

2. An adjustable stay of the kind described comprising a tubular body adapted for attachment by a bracket, a central rod slidable therein and also adapted for attachment by a bracket, a friction grip applied between the body and the rod at the one end of said body and which is in the form of a split bush pressed into action by a coiled spring operative between the one end of the bush and a sleeve-like nut applied to this end of the body, a hand operated member in the form of a cap nut applied to the other end of said body, and a tubular connector disposed within the body between the cap nut and one end of the bush, substantially as described.

3. An adjustable stay of the kind described, comprising a tubular body adapted for attachment by a bracket, a central rod slidable therein and also adapted for attachment by a bracket, an automatically acting friction grip between the body and the rod at the one end of said body and which can be adjusted as to the amount of its grip, a cap nut applied to the other end of said body, and a tubular connector disposed within the body to surround the rod and adapted for operation between the cap nut and the friction grip, substantially as described.

In testimony whereof I have hereunto set my hand.

WILLIAM SCHONFIELD.